May 7, 1963
A. W. BRUECKNER ETAL
3,088,481
HYDRAULIC SWITCHING SYSTEM
Filed Jan. 4, 1960
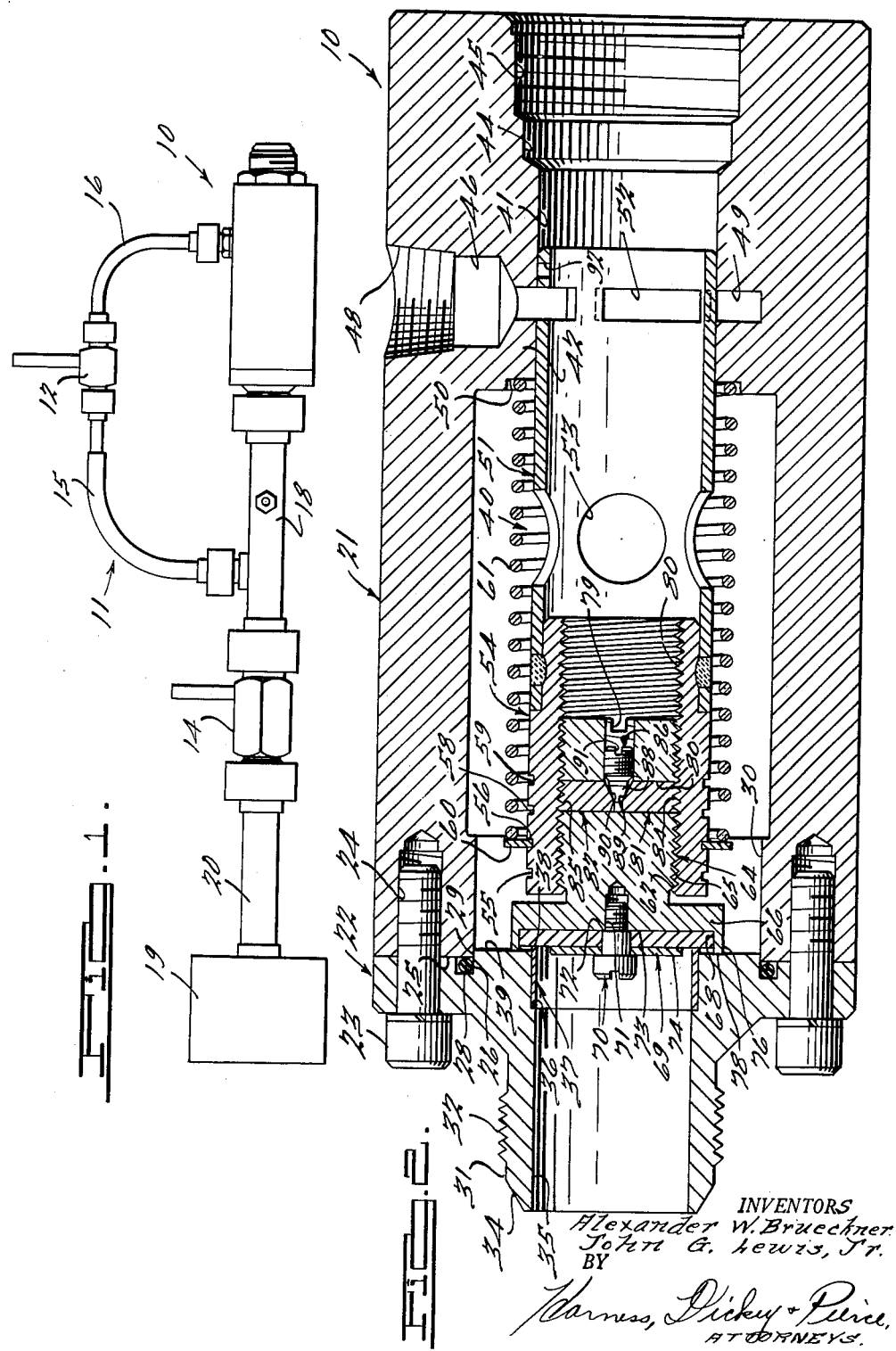
INVENTORS
Alexander W. Brueckner
John G. Lewis, Jr.
BY
Harness, Dickey & Pierce,
ATTORNEYS.

United States Patent Office 3,088,481
Patented May 7, 1963

3,088,481
HYDRAULIC SWITCHING SYSTEM
Alexander W. Brueckner, Farmington, and John G. Lewis, Jr., Detroit, Mich., assignors, by mesne assignments, to Cox Instruments Corporation, Detroit, Mich., a corporation of Michigan
Filed Jan. 4, 1960, Ser. No. 111
5 Claims. (Cl. 137—117)

This invention relates generally to a hydraulic switching system, and more particularly to an automatic differential pressure responsive by-pass valve.

Automatic by-pass valves are often used to direct fluid flow through one of a plurality of devices in accordance with a pressure or flow condition that is sensed by the by-pass valve. One such application of a by-pass valve is to direct fluid flow through one of a plurality of hydraulic transducers, for example fluid flow meters, in response to a predetermined pressure across one or more of the transducers.

Flow meters are capable of accurately measuring the rate of fluid flow in only a particular range determined by the design and capacity of the meter. In order to accurately measure the rate of fluid flow across a wide range, it is necessary to derive the flow-rate indication from the one of a plurality of meters which is then operating within its design range. Inherently, flow meters present a certain internal resistance to fluid flow, which is evidenced by a fluid pressure drop across the meter. It is desirable to cut out the low rate meters at high rates of flow to avoid the drop across the low rate meters and to prevent damage or undue wear on the low rate meters.

Characteristically, the aforementioned pressure differential varies with and is indicative of the rate of fluid flow. At such times as the rate of flow is above or below the design range of the meter, a differential pressure responsive by-pass valve functions to direct the flow of fluid through a meter of appropriate capacity.

Accordingly, one object of the present invention is to provide a by-pass valve that is automatically responsive to a predetermined differential pressure in a fluid system.

Another object is to extend the range of adjustment of the operating pressure differential of a by-pass valve by providing major adjustments by part selection, coarse adjustment by part installation and an additional fine adjustment.

Another object is to improve the sensitivity of a by-pass valve so that it operates in response to a relatively small variation from a predetermined pressure differential.

Another object is to utilize regenerative pressure feedback to accelerate the opening and closing movement of a by-pass valve.

Other objects and advantages of the present invention will become apparent from the following detailed description, wherein reference is made to the drawings, in which:

FIGURE 1 is a side elevation of a by-pass valve, shown operatively associated with a flow metering system; and FIG. 2 is a cross-sectional view of the by-pass valve of the present invention.

Referring to FIG. 1, a by-pass valve 10, in accordance with one embodiment of the present invention, is operatively connected in a flow metering system 11. The system 11 comprises a low rate flow meter 12 and a high rate flow meter 14 connected upstream in series with said low rate flow meter by means of conduits 15 and 18. The low rate meter 12 is connected to the by-pass valve 10 by a conduit 16. The conduit 18 also connects the high rate meter 14 to the by-pass valve 10. A pump 19 maintains fluid pressure in the system 11 and is connected to the high rate meter 14 by a conduit 20.

The by-pass valve 10 functions to divert fluid flow from the pump 19 through the conduit 15, low rate flow meter 12, conduit 16, and by-pass valve 10 at such times as the rate of fluid flow is within the capacity of the low rate flow meter 12.

Referring particularly to FIG. 2, the by-pass valve 10 comprises a tubular housing 21 for the support and enclosure of the components of the by-pass valve 10. An end cap 22 is secured to the housing 21 as by a plurality of machine screws 23 that are threadably engaged in a like plurality of threaded holes 24 in a transverse end face 25 of the housing 21. The end cap 22 has a circular groove 26 for the acceptance and retention of a sealing ring 28, for example an O ring, that is biased against the end face 25 of the housing 21 upon tightening of the screws 23 to effect a fluid tight seal between the end cap 22 and the tubular housing 21. The end cap 22 has an axially inwardly extending boss 29 that is engageable with an interior surface 30 of the housing 21 to aid in locating the end cap 22 with respect to the housing 21.

The end cap 22 has an axially outwardly extending nipple 31 having a threaded portion 32 and a tapered portion 34 thereon to facilitate fluid sealing engagement of the by-pass valve 10 with the fluid conductor 18. The nipple 31 of end cap 22 has a central bore 35 that is axially aligned with the central axis of the tubular housing 21 and functions as a high pressure fluid inlet into the housing 21, as will be described.

The bore 35 in the end cap 22 has a counterbore 36 for the acceptance of a sleeve 37, the end face 38 of which functions as a valve seat. The sleeve 37, and therefore the valve seat 38, extends axially beyond an inner face 39 of the end cap 22 for a reason to be discussed.

A slidable valve 40 is disposed centrally of the housing 21 for reciprocating motion axially thereof. The valve 40 is supported in a valve journal 41 in a transverse end wall 42 of the housing 21. The end wall 42 has a bore 44 axially aligned and communicating with the journal 41 to provide a fluid outlet from the housing 21. The bore 44 has a threaded portion 45 to facilitate connection of the by-pass valve 10 to a fluid conductor (not shown). The end wall 42 has a transverse bore 46 that defines a low pressure fluid inlet into the housing 21. The bore 46 has a threaded portion 48 to facilitate connection of the conduit 16 thereto. An annular chamber 49 communicates with the low pressure inlet 46 and the valve journal 41 to admit fluid into the housing 21. The end wall 42 has an annular spring seat 50 therein for a reason to be discussed.

The valve 40 comprises a sleeve 51 that is slidably supported by the valve journal 41. The sleeve 51 has a plurality of generally rectangular circumferentially disposed slots 52 that normally admit fluid into the housing 21 from the annular chamber 49 and low pressure inlet 46. The sleeve 51 is provided with a plurality of circumferentially spaced apertures 53 for the passage of fluid through the sleeve 51, as will be described.

A tubular extension 54 is secured to the sleeve 51, as by welding. The tubular extension 54 has a plurality of spaced grooves 55, 56, 58 and 59 on the outer peripheral surface thereof for the acceptance of a spring retainer ring 60. The spring retainer ring 60 is removably engageable in one of the peripheral grooves 56, 58, 59 or 60, selectively, as a first adjustment of the bias of a helical compression spring 61 on the valve 40. The spring 61 extends between the retainer ring 60 and the spring seat 50 in the end wall 42 of the housing 21.

The internal peripheral surface of the tubular extension 54 is provided with threads 62 for the acceptance of a valve seal retainer 64 having a complementary threaded portion 65. The valve seal retainer 64 has a radial flange 66 at the outer end thereof having a counterbore 68 for the acceptance of a valve seal 69. The valve seal 69 is preferably made from an elastomer impervious to the particular fluid in the system 11. The valve seal 69 is biased into the counterbore 68 as by a machine screw 70 that is engaged in a threaded bore 71 in the valve seal retainer 64. A shoulder 72 on the machine screw 70 engages a transverse end face 73 on the valve seal retainer 64 to limit advancement of the screw 70 which therefore biases the seal 69 into the counterbore 68 with a predetermined pressure.

The seal 69 is flatly maintained against the transverse end face 73 of the counterbore 68 by a washer 74 that is disposed about the screw 70.

The counterbore 68 in the flange 66 cooperates with an outer surface 76 on the radial flange 66 of the valve seal retainer to define an annular end face 78 on the valve seal retainer 64 that is engageable with the transverse inner face 39 of the end cap 22 to limit movement of the valve 40 towards the valve seat 38 under the bias of the spring 61 on the valve 40 thereby limiting compression of the valve seal 69.

The relationship between the seal 69 and the seat 38, on the one hand, and the ports 52 and channels 49, on the other hand, is selected and adjusted by rotating members 54 and 64 relative to one another. In the disclosed arrangement, this is accomplished by holding member 64 against rotation relative to housing 21 and by rotating member 54 with respect thereto to shift member 54 axially with respect to member 64 by virtue of the resultant screwing or unscrewing of the two elements 54—64. In the illustrated form, member 64 is held against rotation by inserting a tool, such as a screwdriver, in the slot 79 (although other means, to be described, may alternatively be employed), and member 54 is rotated in any suitable fashion, such as by means of a tool inserted in one or more slots or apertures 92 formed in member 54.

The valve seal retainer 64 has a bore 80 extending diametrically therethrough for the acceptance of a pair of locking slugs 81 and 82. The locking slugs 81 and 82 have end portions 84 and 85, respectively, with a thread configuration complementary to the threads 62 on the internal surface of the tubular extension 54. The locking slugs 81 and 82 are cammed radially outwardly against the tubular extension 54 by a locking screw 86 having a conical forward portion 88 that engages a pair of cam surfaces 89 and 90 on the locking slugs 81 and 82, respectively. The locking screw 86 has a slot 91 for the acceptance of the blade of a conventional screw driver to facilitate advancement thereof.

Initially, a critical pressure differential across, for example, the low rat flow meter 12, to which the by-pass valve 10 is to respond is determined, in the system illustrated, by determining the pressure drop across the low rate flow meter 12 at the maximum rate of flow that the meter 12 is capable of accurately measuring. Rates of fluid flow resulting in pressure differentials less than this critical pressure differential are accurately measured by the flow meter 12. Alternatively, the bypass valve can be adjusted to respond to a pressure differential indicative of the lower limit of the design range of a flow meter.

After the critical pressure differential across the meter 12 is determined, the by-pass valve 10 is adjusted to automatically respond to that pressure differential.

With the spring retainer 60 placed in a selected one of the grooves 55, 56, 58, or 59, the locking screw 86 is backed off so as to release the radially outward bias on the locking slugs 81 and 82 against the tubular extension 54 to permit rotation of the tubular extension 54 with respect to the valve seal retainer 64. The retainer 64 is held from rotation as by engaging a screw driver in the slot 79 in the end plug 64, or, if desired, cooperating elements may be disposed or formed on or in the face 39 and the element 66 to prevent relative rotational motion therebetween while permitting relative motion in translation. The tubular extension 54 is then rotated as by engaging a spanner wrench (not shown) in an aperture 92 (or a plurality of such apertures) on the sleeve 51. The sleeve 51 is rotated to move the tubular extension 54 and sleeve 51 to a position in which there is a desired relationship between the ports 52 and the chamber 49. In the presently preferred arrangement in which the ports 52 are of substantial area, initial movement of the ports 52 from alignment with chamber 49 has relatively little effect on the rate of fluid flow through the inlet 46. Therefore, in order to provide a rapid reduction of the fluid flow through the ports 52 in response to a predetermined pressure differential across the meter 12, the ports 52 are initially closed, by the aforementioned rotation of the sleeve 51, until a significant reduction in fluid flow is apparent at the meter 12. When the ports 52 are so adjusted, the first increment of movement thereof, upon the occurrence of a predetermined pressure differential across the meter 12, produces a relatively large and rapid throttling of fluid flow through the meter 12.

After adjusting the position of the ports 52 relative to the chamber 49, the locking screw 86 is advanced to cam the locking slugs 81 and 82 radially outwardly against the tubular extension thereby locking the retainer 64 with respect to the tubular extension 54.

At relatively low rates of fluid flow, fluid is shunted through the low pressure meter 12 and into the low pressure inlet 46 of the by-pass valve 10. Fluid enters the annular chamber 49 and flows through the ports 52 in the sleeve 51, then outwardly through the discharge port 44. It is to be noted that fluid is also admitted to the rear side of the valve 40 through the apertures 53 therein to cooperate with spring 61 in exerting a force tending to hold the valve 40 in the closed position. Upon the occurrence of the predetermined critical fluid pressure differential across the low rate flow meter 12, the pressure on the inlet side of the low rate flow meter 12, and therefore in the conduit 18, becomes sufficiently greater than the fluid pressure on the rear side of the valve 40 to overcome the bias of the spring 61 whereupon the valve 40 moves rearwardly.

Movement of the valve 40 results in closure of the passageway defined by the ports 52 in the sleeve 51 and the annular chamber 49, thereby throttling fluid flow through the low rate meter 12. The throttling of the fluid flow tends to produce a reduction of the fluid pressure on the rear (right-hand, FIG. 2) side of the valve 40, producing an increase of the pressure differential across that valve so that the valve 40 tends to snap to the open position. It will be appreciated that this increase in the pressure differential resulting from the closure or restriction of the passageway defined by ports 52 and chamber 49 is in a positive or regenerative direction.

The movement of valve 40 which results in closure of the passageway defined by ports 52 and chamber 49 also, of course, results in a separation of the valve seal 69 from the valve seat 38 to permit the fluid flow from the meter 14 (FIG. 1), conduit 18, bore 35 (FIG. 2), past the valve seal 69, through housing 21, ports 53, and then through the output port of valve 10. It will be recognized that after the low pressure inlet 46 is closed, the only force that must be overcome by the fluid to maintain valve 69—38 open in the bias of the spring 61.

At such time as the pressure differential across the flow meter 12 decreases to a preselected value as, for example, when the rate of flow decreases, the inertia of the fluid against the valve 40 decreases allowing the spring 61 to bias the valve 40 toward the closed position. When the low pressure ports 52 crack open, fluid pressure behind the valve carrier 40 supplements the closing movement of the valve 40, again resulting in a snap action.

Because the valve seat 38 is relatively small in cross-sectional area, the by-pass valve 10 responds accurately to a predetermined pressure differential. The effect of this relatively narrow-lipped valve seat is to minimize the differences between the effective areas on opposite sides of the valve against which fluid is operative.

While in the preferred mode of utilizing the disclosed valve, the grooves 55, 56, 58 and 59 (in combination, if desired, with the selection of springs 61 of various rates) permits an adjustment of the critical pressure differential and the adjustment of element 51 relative to element 64 is utilized, in effect, to set the valve to an initial or "zero" position, it is also contemplated that the selection of the spring may be used as a gross or major selection of the pressure differential at which the valve will be actuated, the grooves 55, 56, 58 and 59 may be used as a course adjustment, and the rotation of elements 51 and 64 may be used as a fine or micrometer adjustment of that differential.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An automatic pressure responsive valve for association with a limited capacity hydraulic transducer and a relatively higher capacity hydraulic transducer for automatically establishing a by-passing path around said limited capacity transducer in response to a predetermined pressure condition, comprising a housing defining a chamber, first, second and third ports in said housing communicating with said chamber, and means for directing flow from between said second and third ports to between said first and third ports upon the occurrence of said predetermined fluid pressure condition comprising a sleeve of relatively small cross-sectional area surrounding said first port having an end portion within said chamber defining an annular seat raised from and surrounding said first port, a first valve comprising a valve head having a circular recess for the support of a valve seal engageable with said valve seat for closing said first port, a sleeve valve for closing said second port, means interconnecting said valve head and said sleeve valve for causing said sleeve valve to close said second port in response to opening movement of said valve head, resilient means biasing said first valve to the closed position and for biasing said sleeve valve to open position, and means including said connecting means for adjusting the positional relationship between said valve head and said sleeve valve.

2. The combination of claim 1 in which said valve head threadedly engages said sleeve valve and in which said adjustment is accomplished by rotating said valve head and said sleeve valve relative to one another.

3. In a system including a limited capacity hydraulic transducer and a relatively higher capacity hydraulic transducer, pressure responsive means for automatically establishing a fluid by-passing path around the limited capacity transducer and for blocking fluid flow through the limited capacity transducer in response to a predetermined pressure condition comprising a housing, a first fluid inlet in said housing, a second fluid inlet in said housing, a fluid outlet in said housing, first valve means controlling fluid flow from said first inlet to said outlet, second valve means controlling fluid flow from said second inlet to said outlet, means for blocking fluid flow from said housing except solely through said fluid outlet including said housing, a tubular member having one end threadably engaging said first valve means and an opposite end fixedly secured to said second valve means, means for locking said first valve means with respect to said tubular member, means including said tubular member for causing flow to pass through said first inlet as said second valve means moves to close said second inlet, resilient means biasing said first valve means to close said first fluid inlet, and means for supplementing the bias of said resilient means on said first valve means in inverse relationship to the extent of movement of said first valve and for accelerating the opening movement of said first valve means after initiation thereof.

4. An automatic pressure responsive valve for association with a limited capacity hydraulic transducer and a relatively higher capacity hydraulic transducer for automatically establishing a by-passing path around said limited capacity transducer in response to a predetermined pressure condition, comprising a housing defining a chamber, first, second and third ports in said housing communicating with said chamber, and means for directing flow from between said second and third ports to between said first and third ports upon the occurrence of said predetermined fluid pressure condition comprising an annular valve seat of relatively small cross-sectional area surrounding said first port, a first valve comprising a valve head having a circular recess for the support of a valve seal engageable with said valve seat for closing said first port, a sleeve valve for closing said second port, means interconnecting said valve head and said sleeve valve for causing said sleeve valve to close said second port in response to opening movement of said valve head, resilient means biasing said first valve to the closed position and biasing said sleeve valve to open position, means including said connecting means for adjusting the positional relationship between said valve head and said sleeve valve, and means for locking said valve head in preselected adjusted relationship to said sleeve valve.

5. An automatic pressure responsive valve for association with a limited capacity hydraulic transducer and a relatively higher capacity hydraulic transducer for automatically establishing a by-passing path around said limited capacity transducer in response to a predetermined pressure condition, comprising a housing defining a chamber, first, second and third ports in said housing communicating with said chamber, and means for directing flow from between said second and third ports to between said first and third ports upon the occurrence of said predetermined fluid pressure condition comprising an annular valve seat of relatively small cross-sectional area surrounding said first port, a first valve comprising a valve head having circular recess for the support of a valve seal engageable with said valve seat for closing said first port, a sleeve valve for closing said second port, means interconnecting said valve head and said sleeve valve for causing said sleeve valve to close said second port in response to opening movement of said valve head, resilient means biasing said first valve to the closed position and biasing said sleeve valve to an open position, said valve head threadingly engaging said sleeve valve for adjusting the positional relationship between said valve head and said sleeve valve by rotating said valve head and said sleeve valve relative to one another, and means for locking said valve head in preselected adjusted relationship to said sleeve valve.

References Cited in the file of this patent

UNITED STATES PATENTS 771,417     Burrows _____ Oct. 4, 1904

(Other references on following page)

UNITED STATES PATENTS

| | | |
|---|---|---|
| 823,185 | Miller | June 12, 1906 |
| 934,504 | Connet | Sept. 21, 1909 |
| 966,319 | Dilts | Aug. 2, 1910 |
| 1,319,380 | De Laval et al. | Oct. 21, 1919 |
| 1,506,820 | Erdman et al. | Sept. 2, 1924 |
| 1,595,063 | Anderson | Aug. 10, 1926 |
| 1,928,433 | Nuebling | Sept. 26, 1933 |
| 2,403,028 | Smith | July 2, 1946 |
| 2,609,829 | Davies | Sept. 9, 1952 |
| 2,651,491 | Ashton et al. | Sept. 8, 1953 |
| 2,665,704 | Kanuch | Jan. 12, 1954 |
| 2,874,718 | Kelly | Feb. 24, 1959 |
| 2,900,166 | Booseman | Aug. 18, 1959 |
| 2,905,191 | Vander Kaay | Sept. 22, 1959 |

FOREIGN PATENTS

| | | |
|---|---|---|
| 117,608 | Germany | Feb. 14, 1901 |
| 1,015,654 | Germany | Sept. 12, 1957 |